United States Patent
Merker et al.

(10) Patent No.: US 7,154,740 B2
(45) Date of Patent: Dec. 26, 2006

(54) SUBSTITUTED POLY(ALKYLENEDIOXYTHIOPHENES) AS SOLID ELECTROLYTES IN ELECTROLYTIC CAPACITORS

(75) Inventors: Udo Merker, Köln (DE); Knud Reuter, Krefeld (DE); Klaus Lerch, Kaarst (DE)

(73) Assignee: H. C. Starck GmbH, Goslar (DE)

( * ) Notice: Subject to any disclaimer, the term of this patent is extended or adjusted under 35 U.S.C. 154(b) by 0 days.

(21) Appl. No.: 10/641,560

(22) Filed: Aug. 15, 2003

(65) Prior Publication Data

US 2004/0085711 A1    May 6, 2004

(30) Foreign Application Priority Data

Aug. 16, 2002  (DE) ................ 102 37 577

(51) Int. Cl.
*H01G 9/02* (2006.01)
*H01G 9/00* (2006.01)

(52) U.S. Cl. ............... 361/525; 252/62.2; 29/25.03
(58) Field of Classification Search ........ 361/523–531; 29/25.03; 252/62.2
See application file for complete search history.

(56) References Cited

U.S. PATENT DOCUMENTS

| | | | |
|---|---|---|---|
| 4,910,645 A | 3/1990 | Jonas et al. | 340/525 |
| 4,959,430 A | 9/1990 | Jonas et al. | 339/257 |
| 4,987,042 A | 1/1991 | Jonas et al. | 339/213 |
| 5,035,926 A | 7/1991 | Jonas et al. | 339/393.1 |
| 5,111,327 A | 5/1992 | Blohm et al. | 526/256 |
| 5,187,608 A | 2/1993 | Blohm et al. | 359/273 |
| 6,219,223 B1* | 4/2001 | Kobayashi et al. | 361/525 |
| 6,324,051 B1* | 11/2001 | Igaki et al. | 361/523 |
| 2003/0216540 A1* | 11/2003 | Reuter | 528/380 |

FOREIGN PATENT DOCUMENTS

| | | |
|---|---|---|
| EP | 1 321 483 | 6/2003 |
| WO | 00 60620 | 10/2000 |

OTHER PUBLICATIONS

L. Groenendaal et al., Adv. Mater. (2000) 12, No. 7, "Poly(3,4-ethylenedioxythiophene) and Its Derivatives: Past, Present, and Future" pp. 481-494.
J. Am. Chem. Soc., vol. 85, (month unavailable) (1963) pp. 454-458, "Polymerization of Benzene to p-Polyphenyl by Aluminum Chloride-Cupric Chloride[1]" P. Kovacic and A. Kyriakis.
J. Polym. Sc. Part A Polymer Chemistry vol. 26, pp. 1285-1294, (month unavailable) (1988) "New Chemically Prepared Conducting Pyrrole Blacks"; J.A. Walker, LF. Warren, E.F. Witucki.

* cited by examiner

Primary Examiner—Eric W. Thomas
(74) Attorney, Agent, or Firm—Joseph C. Gil

(57) ABSTRACT

Described is an electrolytic capacitor that includes: (a) a layer of an oxidizable metal; (b) a layer of an oxide of the oxidixable metal; (c) a solid electrolyte; and (d) a plurality of contacts. The solid electrolyte includes a polythiophene having recurring units represented by the following formulas (I-a) and/or (I-b),

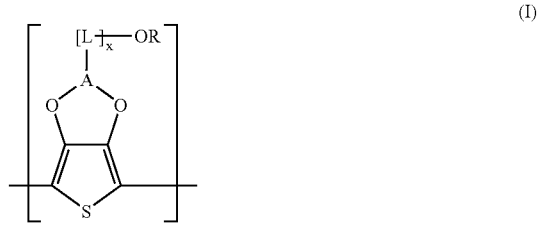

(I)

Also described are processes for producing electrolytic capacitors, and conductive layers that include such polythiophenes.

28 Claims, 4 Drawing Sheets

SUBSTITUTED POLY(ALKYLENEDIOXYTHIOPHENES) AS SOLID ELECTROLYTES IN ELECTROLYTIC CAPACITORS

BACKGROUND OF THE INVENTION

1. Field of the Invention

The invention relates to electrolytic capacitors comprising specifically substituted poly(alkylenedioxythiophenes) as solid electrolytes and their production, and also relates to conductive layers of specifically substituted poly(alkylenedioxythiophenes), their preparation and use.

2. Brief Description of the Prior Art

The class of π-conjugated polymers (also referred to as conductive polymers or synthetic metals) has been the subject of numerous publications in recent decades. Such conductive polymers are gaining increasing economic importance, since they have advantages over metals with respect to processability, weight and the ability to adjust properties in a targeted manner by means of chemical modification.

Examples of known π-conjugated polymers are polypyrroles, polythiophenes, polyanilines, polyacetylenes, polyphenylenes and poly(p-phenylene-vinylenes). Their method of preparation and use, as well as the associated disadvantages are described below.

A review of numerous poly(alkylenedioxythiophene) derivatives, in particular poly-(3,4-ethylenedioxythiophene) derivatives, their monomer building blocks, syntheses and uses are given by L. Groenendaal, F. Jonas, D. Freitag, H. Pielartzik & J. R. Reynolds, Adv. Mater. 12 (2000) 481–494. A particularly important and industrially utilized polythiophene is poly-3,4-(ethylene-1,2-dioxy)thiophene, often also referred to as poly(3,4-ethylenedioxythiophene), which in its oxidized form displays very high conductivities and is described, for example, in EP-A 339 340. U.S. Pat. No. 5,111,327 and U.S. Pat. No. 5,187,608 describe the use of substituted poly-(3,4-alkylenedioxythiophenes) as electroactive polymers, e.g. in electrochromic windows (smart windows). Blohm et al. (U.S. Pat. No. 5,111,327 and U.S. Pat. No. 5,187,608) have shown that the conductivity of polymer layers of substituted 3,4-alkylenedioxythiophenes prepared by chemical oxidation is higher after subsequent electrochemical reduction followed by electrochemical oxidation than that of corresponding layers of unsubstituted poly(3,4-ethylenedioxythiophene). However, the electrochemical reduction and reoxidation introduces a considerable complication into the process.

The European patent specification EP-A 340 512 describes the preparation of a solid electrolyte from 3,4-ethylene-1,2-dioxythiophene and the use of its cationic polymer prepared by oxidative polymerization as solid electrolyte in electrolytic capacitors. Poly(3,4-ethylenedioxythiophene) as replacement for manganese dioxide or charge transfer complexes in solid electrolyte capacitors reduces the equivalent series resistance of the capacitor and improves the frequency behaviour as a result of the higher electrical conductivity.

Leakage current of such a capacitor depends essentially on the quality of the polymer film: if graphite or silver penetrates through the polymer film and thus comes into contact with the dielectric, the leakage current increases drastically since defects in the oxide layer can no longer be isolated via the local destruction of the conductive polymer (self-healing effect).

In their preparation, after a chemical polymerization, it may be necessary to wash out the salts, i.e. excess oxidant and its reduced form, in order to obtain layers of satisfactory quality. Otherwise, crystallization of the salts can lead to an increased series resistance over the course of time due to formation of contact resistances. In addition, the crystals can damage the dielectric or the outer contact layers when the capacitor is mechanically stressed, so that the leakage current rises. It is therefore desirable to suppress the crystallization of salts of the oxidant or residual salts of its reduced form which remain in the capacitor despite washing.

There is therefore a continuing need to increase the conductivity and related quality of known layers of poly(3,4-ethylenedioxythiophene), particularly in respect of the above-described use in electrolytic capacitors, in order to achieve improved performance. More particularly, it is desirable to achieve a further decrease in the equivalent series resistance and the leakage current of solid electrolyte capacitors. In addition, simple methods of production of the layers or the electrolytic capacitors are desirable.

It is therefore an object of the invention to provide or discover suitable electrically conductive polymers which can be used for preparation of electrically conductive layers and especially as solid electrolytes in electrolytic capacitors, and to improve the conductivity and related quality, in particular better binding of residual salts and improved homogeneity, as compared to the properties of known polymers such as poly(3,4-ethylenedioxythiophene).

SUMMARY OF THE INVENTION

It has now surprisingly been found that polythiophenes comprising recurring units of the formula (I),

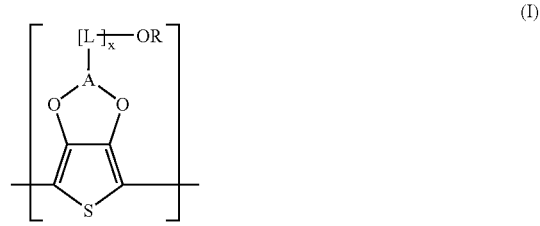

where
A is a $C_1$–$C_5$-alkylene radical which is substituted at any point by an —OR group, optionally via a spacer L, and may bear further substituents,
L is a methylene group,
x is 0 or an integer greater than or equal to 1, preferably 0 or an integer from 1 to 6, particularly preferably 0 or 1,
R is H or $C_1$–$C_{18}$-alkyl, $C_7$–$C_{18}$-aralkyl, $C_5$–$C_{14}$-aryl or $C_5$–$C_{12}$-cycloalkyl which may each be unsubstituted or additionally substituted by $SO_3H$, $SO_3^-$, COOH or $COO^-$,
meet the objectives of this invention.

The present invention accordingly provides an electrolytic capacitor comprising
a layer of an oxidizable metal
a layer of oxide of this metal
a solid electrolyte
contacts characterized in that the solid electrolyte comprises polythiophenes comprising recurring units of the formula (I),

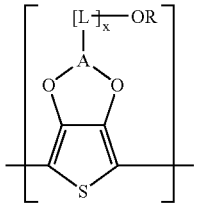 (I)

where

A is a $C_1$–$C_5$-alkylene radical which is substituted at any point by an —OR group, optionally via a spacer L, and may bear further substituents, L is a methylene group, x is 0 or an integer greater than or equal to 1, preferably 0 or an integer from 1 to 6, particularly preferably 0 or 1, R is H or $C_1$–$C_{18}$-alkyl, $C_7$–$C_{18}$-aralkyl, $C_5$–$C_{14}$-aryl or $C_5$–$C_{12}$-cycloalkyl which may each be unsubstituted or additionally substituted by $SO_3H$, $SO_3^-$, COOH or $COO^-$.

In a preferred embodiment, the invention encompasses an electrolytic capacitor whose solid electrolyte comprises polythiophenes comprising recurring units of the formulae (I-a) and/or (I-b),

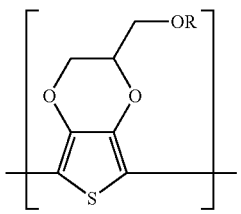 (I-a)

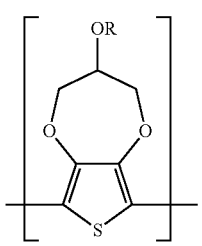 (I-b)

where

R is as defined above for the formula (I).

In a particularly preferred embodiment, the invention encompasses an electrolytic capacitor whose solid electrolyte comprises polythiophenes comprising recurring units of the formulae (I-a-1) and/or (I-b-1)

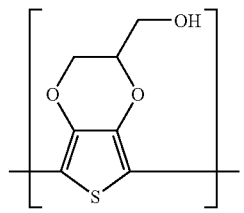 (I-a-1)

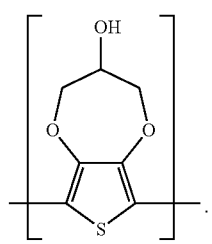 (I-b-1)

In a more particularly preferred embodiment, the invention encompasses an electrolytic capacitor which is characterized in that the oxidizable metal is a valve metal or a compound having comparable properties.

For the purposes of the present invention, valve metals are metals whose oxide layers do not allow current to flow equally well in both directions: if an anodic voltage is applied, the oxide layers of the valve metals block current flow, while applying a cathodic voltage results in large currents which can destroy the oxide layer. Valve metals include Be, Mg, Al, Ge, Si, Sn, Sb, Bi, Ti, Zr, Hf, V, Nb, Ta and W and alloys or compounds of at least one of these metals with other elements. The best known representatives of valve metals are Al, Ta and Nb. Compounds having comparable properties are ones which have metallic conductivity and are oxidizable, and whose oxide layers have the above-described properties of oxide layers of valve metals. For example, NbO has metallic conductivity but is generally not regarded as a valve metal. However, layers of oxidized NbO display the typical properties of valve metal oxide layers, so that NbO or an alloy or compound of NbO with other elements are typical examples of such compounds having comparable properties. Accordingly, the term "oxidizable metal" refers not only to metals but also to alloys or compounds of a metal with other elements, as long as they have metallic conductivity and are oxidizable.

DETAILED DESCRIPTION OF THE INVENTION

Figure 1:
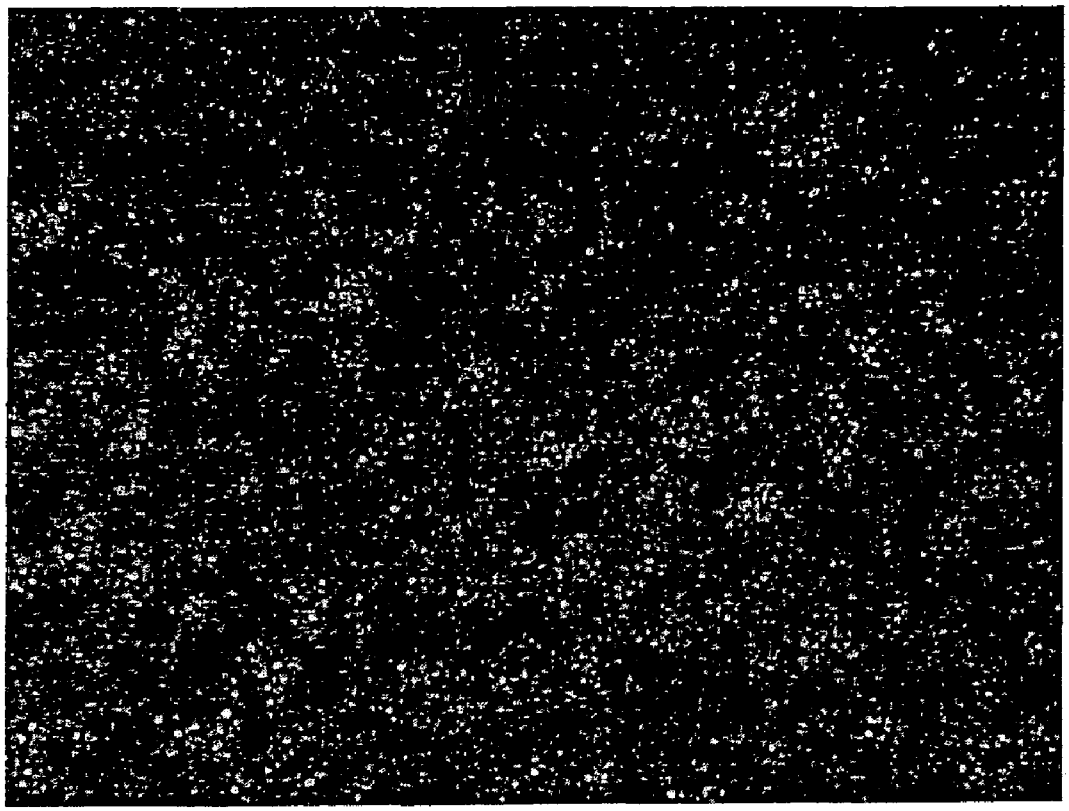
FIG. 1 shows an optical microscope image of a conductive film of substituted poly(3,4-alkylenedioxythiophene) according to the invention prepared from compounds (II-a-1) and (II-b-1).

The present invention particularly preferably provides an electrolytic capacitor which is characterized in that the valve metal or the compound having comparable properties is tantalum, niobium, aluminium, titanium, zirconium, hafnium, vanadium, an alloy or compound of at least one of these metals with other elements, NbO or an alloy or compound of NbO with other elements.

In the electrolytic capacitor of the invention, the "oxidizable metal" preferably forms an anode body having a large surface area, e.g. in the form of a porous sintered body or a roughened foil. In the following, this will also be referred to as anode body for short.

For the purposes of the invention, $C_1$–$C_5$-alkylene radicals A are methylene, ethylene, n-propylene, n-butylene or n-pentylene. The expression $C_1$–$C_{18}$-alkyl refers, for the purposes of the invention, to linear or branched $C_1$–$C_{18}$-alkyl radicals such as methyl, ethyl, n-propyl or isopropyl, n-butyl, isobutyl, sec-butyl or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$–$C_{12}$-cycloalkyl refers to $C_5$–$C_{12}$-cycloalkyl radicals such as cyclopentyl, cyclohexyl, cycloheptyl, cyclooctyl, cyclononyl or cyclodecyl, $C_5$–$C_{14}$-aryl refers to $C_5$–$C_{14}$-aryl radicals such as phenyl or naphthyl, and $C_7$–$C_{18}$-aralkyl refers to $C_7$–$C_{18}$-aralkyl radicals such as benzyl, o-, m-, p-tolyl, 2,3-, 2,4-, 2,5-, 2,6-, 3,4-, 3,5-xylyl or mesityl. The above listing serves to illustrate the invention by way of example and is not to be regarded as comprehensive.

Possible further substituents on the $C_1$–$C_5$-alkylene radicals A can be numerous organic groups, for example alkyl, cycloalkyl, aryl, halogen, ether, thioether, disulphide, sulphoxide, sulphone, amino, aldehyde, keto, carboxylic ester, carbonate, cyano, alkylsilyl and alkoxysilyl groups and also carboxyamide groups.

The polythiophenes present as solid electrolyte in the electrolytic capacitors of the invention are preferably cationic polythiophenes, with "cationic" referring only to the charges located on the main polythiophene chain. In the case of repeating units of the formulae (I), (I-a) and (I-b), the polythiophenes can bear positive and negative charges in the structural unit, with the positive charges being located on the main polythiophene chain and the negative charges being located on the radicals R substituted by sulphonate or carboxylate groups. The positive charges on the main polythiophene chain can be partly or completely balanced by the anionic groups on the radicals R. Viewed overall, the polythiophenes can in this case be cationic, uncharged or even anionic. Nevertheless, they are all regarded as cationic polythiophenes for the purposes of the invention, since the positive charges on the main polythiophene chain are the determining factor. The positive charges are not shown in the formulae since their precise number and position cannot be established unambiguously. However, the number of positive charges is at least one and not more than n, where n is the total number of all recurring units (identical or different) within the polythiophene, as described more fully hereunder.

To balance the positive charge, insofar as this has not already been done by the radicals R which may be substituted by sulphonate or carboxylate groups and thus be negatively charged, the cationic polythiophenes require anions as counterions.

These can be monomeric or polymeric anions, the latter being hereinafter referred to as polyanions.

Polyanions used are preferably the anions of polymeric carboxylic acids such as polyacrylic acids, polymethacrylic acid or polymaleic acids, or the anions of polymeric sulphonic acids such as polystyrenesulphonic acids and polyvinylsulphonic acids. These polycarboxylic and polysulphonic acids can also be copolymers of vinylcarboxylic and vinylsulphonic acids with other polymerizable monomers such as acrylic esters and styrene.

The anion of polystyrenesulfonic acid is particularly preferred as counterion.

The molecular weight of the poly acids forming the polyanions is preferably from 1,000 to 2,000,000, particularly preferably from 2000 to 500000 number average molecular weight. The polyacids or their alkali metal salts are commercially available, e.g. polystyrenesulphonic acids and polyacrylic acids, or else can be prepared by known methods (cf., for example, Houben Weyl, Methoden der organischen Chemie, vol. E 20 Makromolekulare Stoffe, part 2, (1987), p. 1141 ff.).

Monomeric anions used are, for example, those of alkanesulphonic or cycloalkanesulphonic acids, aromatic sulphonic acids or tetrafluoroborates, hexafluorophosphates, perchlorates, hexafluoroantimonates, hexafluoroarsenates or hexachloroantimonates.

Preference is given to the anions of p-toluenesulfonic acid, methanesulphonic acid or camphorsulphonic acid.

The polythiophenes present as solid electrolyte in the electrolytic capacitors of the invention contain a total of n recurring units of the formula (I), where n is an integer from 2 to 2,000, preferably from 2 to 100. The recurring units of the formula (I) within a polythiophene can be identical or different. They are preferably recurring units of the formula (I-a) and/or (I-b). If recurring units of the formulae (I-a) and (I-b) are present in the polythiophene, the radicals R can be identical or different, but are preferably identical. The units of the formula (I-a) are present in a proportion of from 65 to 99.5%, preferably from 75 to 99%, particularly preferably from 75 to 85%, based on the total number of recurring units in the polythiophene, and the units of the formula (I-b) are present in a proportion of from 0.5 to 35%, preferably from 1 to 25%, particularly preferably from 15 to 25%, based on the total number of recurring units in the polythiophene, with the proviso that the sum of the two proportions is 100%. In the particularly preferred case in which the radicals R are H, the units of the formulae (I-a-1) and (I-b-1) are present in the polythiophene in the proportions described above for (I-a) and (I-b).

At each of the end groups, the polythiophenes present as solid electrolyte in the electrolytic capacitors of the invention preferably bear H at the linkage points.

In principle, such a novel electrolytic capacitor is produced by firstly coating the anode body oxidatively, for example by electrochemical oxidation, with a dielectric, i.e. an oxide layer. In the conductive polymer, according to the invention, a polythiophene of the formula (I), which forms the solid electrolyte is then deposited on the dielectric by means of chemical or electrochemical oxidative polymerization. A coating comprising further layers having a good conductivity, e.g. graphite and silver, serves as current collector. Contacts are finally applied to the capacitor body and the capacitor is encapsulated. In the context of the invention it would be within the purview of the skilled artisan to ascertain the contacts that are useful herein.

The polythiophenes to be used according to the invention are produced on the oxide-coated anode body by oxidative polymerization of 3,4-alkylenedioxythiophenes of the formula (II), hereinafter also referred to as compounds of the formula (II) or thiophenes,

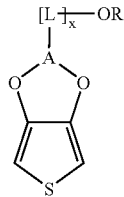

(II)

where
A, L, x and R are as defined above for the formula (I), by applying the thiophenes of the formula (II), oxidants and, if appropriate, counterions, preferably in the form of solutions, to the oxide layer of the anode body, either separately in succession or together, and carrying out the oxidative polymerization to completion, if appropriate with the aid of heating of the coating, depending on the activity of the oxidant used.

The present invention therefore further provides a process for producing an electrolytic capacitor according to the invention, which is characterized in that compounds of the formula (II) or a mixture of compounds of the formula (II),

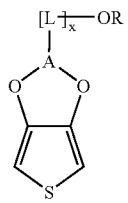

(II)

where
A, L, x and R are as defined above for the formula (I), an oxidant and, if appropriate, counterions are applied to an oxide layer of a metal, either together or in succession and preferably in the form of solutions, and are chemically polymerized at temperatures of from −10° C. to 250° C., preferably at temperatures of from 0° C. to 200° C., to form the polythiophenes comprising recurring units of the formula (I),

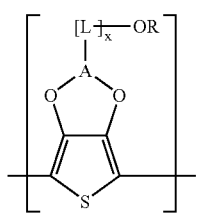

(I)

where
A, L, x and R are as defined above.

Application to the oxide layer of the anode body can be carried out directly or using a coupling agent, for example a silane, and/or another functional layer.

The polythiophenes to be used according to the invention can be applied to the oxide layer of the anode body not only by oxidative chemical means but also by electrochemical oxidation.

The present invention therefore likewise provides a process for producing an electrolytic capacitor according to the invention, which is characterized in that compounds of the formula (II) or a mixture of compounds of the formula (II),

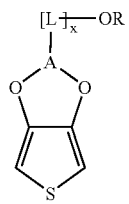

(II)

where
A, L, x and R are as defined above for the formula (I), and counterions are applied, preferably from solution, to an oxide layer of a metal by electrochemical polymerization at temperatures of from −78° C. to 250° C. to form the polythiophenes comprising recurring units of the formula (I),

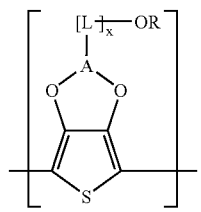

(I)

where
A, L, x and R are as defined above.

Application to the oxide layer of the anode body can be carried out directly or using a coupling agent, for example a silane, and/or another functional layer.

The 3,4-alkylenedioxythiophenes of the formula (II) required for the preparation of the polythiophenes to be used according to the invention are known or can be prepared by known methods (e.g. in the case of x=0 or 1, see U.S. Pat. No. 5,111,327 or U.S. Pat. No. 5,187,608 which are in this respect incorporated herein by reference). In the case of 3,4-alkylenedioxythiophenes of the formula (II) in which R=H and x=1 to 6, the method of acid-catalysed transetherification of 3,4-dialkoxythiophenes with 1,2,ω-alkanetrioles, where (ω=x+2, is suitable. For example, the preparation by transetherification can be carried out by heating the 3,4-dialkoxythiophene and a 1,2,ω-alkanetriole, preferably with the alkanetriole in excess, with p-toluenesulfonic acid as catalyst under $N_2$ for 2 hours (or longer), with the alcohol formed slowly being distilled off. After cooling, the liquid which remains is diluted, for example, with methylene chloride, washed with water until neutral and the organic phase is dried over $Na_2SO_4$. Removal of the solvent gives the 3,4-alkylenedioxythiophene of the formula (II). This process is also described in the German patent application DE 10 215 706. These compounds can be converted by methods known to those skilled in the art, e.g. the Williamson ether synthesis, to give products bearing the other radicals R indicated for formula (II).

In preferred embodiments of the process of the invention, compounds of the formulae (II-a) and/or (II-b) or a mixture of these,

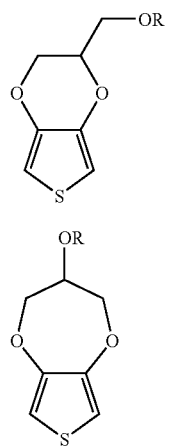

(II-a)

(II-b)

where R is as defined for the formula (I) but is particularly preferably H, are used.

In particularly preferred embodiments of the process of the invention, a mixture of compounds of the formulae (II-a) and (II-b), where R is as defined for the formula (I) but is particularly preferably H, is used.

In these mixtures, the compounds of the formula (II-a) are present in a proportion of from 65 to 99.5%, preferably from 75 to 99%, particularly preferably from 75 to 85%, based on the total molar amount of thiophenes, and the compounds of the formula (II-b) are present in a proportion of from 0.5 to 35%, preferably from 1 to 25%, particularly preferably from 15 to 25%, based on the total molar amount of thiophenes, with the proviso that the sum of the two proportions is 100%.

The oxidative chemical polymerization of the 3,4-alkylenedioxythiophenes of the formula (II) is generally carried out at temperatures of from −10° C. to 250° C., preferably at temperatures of from 0° C. to 200° C., particularly preferably at temperatures of from 20° C. to 200° C., depending on the oxidant used and the desired reaction time.

The solvents which can be used for the ethylenedioxythiophenes of the formula (II) and/or oxidants and/or counterions are, in particular, the following organic solvents which are inert under the reaction conditions: aliphatic alcohols such as methanol, ethanol, i-propanol and butanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorinated hydrocarbons such as dichloromethane and dichloroethane; aliphatic nitriles such as acetonitrile, aliphatic sulphoxides and sulphones such as dimethyl sulphoxide and sulpholane; aliphatic carboxamides such as methylacetamide and dimethylformamide; aliphatic and araliphatic ethers such as diethyl ether and anisole. It is also possible to use water or mixtures of water with the abovementioned organic solvents as solvent.

As oxidants, use is made of the oxidants which are suitable for the oxidative polymerization of thiophenes and are known to those skilled in the art; these are described, for example, in J. Am. Chem. Soc., 85, 454 (1963). For practical reasons, preference is given to inexpensive and easy-to-handle oxidants such as iron(II) salts of inorganic acids, for example $FeCl_3$, $Fe(ClO_4)_3$, and iron(III) salts of organic acids and inorganic acids having organic radicals, also $H_2O_2$, $K_2Cr_2O_7$, alkali metal and ammonium peroxodisulphates, alkali metal perborates, potassium permanganate, copper salts such as copper tetrafluoroborate or cerium(IV) salts or $CeO_2$.

The oxidative polymerization of the thiophenes of the formula II theoretically requires 2.25 equivalents of oxidant per mole of thiophene (cf., for example, J. Polym. Sc. Part A Polymer Chemistry Vol. 26, p. 1287 (1988)). However, lower or higher numbers of equivalents of oxidant can be used.

The use of peroxodisulphates and iron(III) salts of organic acids and inorganic acids having organic radicals has the great practical advantages that they are not corrosive and, in particular, that when they are used the oxidation of the 3,4-alkylenedioxythiophenes of the formula (II) proceeds sufficiently slowly for thiophenes, oxidants and, if appropriate, counterions are applied together from a solution or a printing paste to the oxide layer of the anode body. After application of the solution or the paste, the oxidation can be accelerated by heating the anode body.

When the other abovementioned oxidants such as $FeCl_3$, $H_2O_2$ or perborates are used, the oxidative polymerization proceeds so quickly that separate application of oxidant and thiophene to the substrate to be treated is necessary, but heating is no longer necessary in this case.

Examples of iron(III) salts of inorganic acids having organic radicals are the iron(III) salts of sulphuric monoesters of $C_1$–$C_{20}$-alkanols, e.g. the Fe(III) salt of lauryl sulphates.

Examples of iron(III) salts of organic acids are: the Fe(III) salts of $C_1$–$C_{20}$-alkanesulphonic acids such as methanesulphonic and dodecanesulphonic acids, aliphatic $C_1$–$C_{20}$-carboxylic acids such as 2-ethylhexylcarboxylic acid, aliphatic perfluorocarboxylic acids such as trifluoroacetic acid and perfluorooctanoic acid, aliphatic dicarboxylic acids such as oxalic acid and, in particular, of aromatic, unsubstituted or $C_1$–$C_{20}$-alkyl-substituted sulphonic acids such as benzenesulphonic acid, p-toluenesulphonic acid and dodecylbenzenesulphonic acid and cycloalkanesulphonic acids such as camphorsulphonic acid.

It is also possible to use mixtures of the abovementioned Fe(III) salts of organic acids.

When 3,4-alkylenedioxythiophenes of the formula (II), oxidants and any counterions are applied separately, the oxide layer of the anode body is preferably firstly coated with the solution of the oxidant and optionally counterions and subsequently with the solution of the 3,4-alkylenedioxythiophene. In the preferred joint application of thiophene, oxidant and, if appropriate, counterions, the oxide layer of the anode body is coated with only one solution, namely a solution containing thiophene, oxidant and optionally counterions.

In addition, further components such as one or more organic binders which are soluble in organic solvents, e.g. polyvinyl acetate, polycarbonate, polyvinyl butyral, polyacrylic esters, polymethacrylic esters, polystyrene, polyacrylonitrile, polyvinyl chloride, polybutadiene, polyisoprene, polyethers, polyesters, silicones, styrene-acrylic ester copolymers, vinyl acetate-acrylic ester copolymers and ethylene-vinyl acetate copolymers, or water-soluble binders such as polyvinyl alcohols, crosslinkers such as polyurethanes or polyurethane dispersions, polyacrylates, polyolefin dispersions, epoxysilanes, such as 3-glycidoxypropyltrialkoxysilane, and additives such as surface-active substances can be added to the mixtures used according to the invention. Furthermore, silane hydrolysates, e.g. ones based on tetraethoxysilane, can be added to increase the scratch resistance of coatings.

The solutions to be applied to the oxide layer of the anode body preferably contain from 1 to 30% by weight of the thiophene of the formula (II) and from 0 to 50% by weight, preferably from 0 to 30% by weight, of binders, crosslinkers and/or additives, both percentages being based on the total weight of the solution.

The solutions are applied to the oxide layer of the anode body by known methods, e.g. by dipping, casting, dripping on, squirting, spraying, doctor blade coating, painting or printing.

The removal of the solvents after application of the solutions can be carried out by simple evaporation at room temperature. However, to achieve higher processing speeds, it is more advantageous to remove the solvents at elevated temperatures, e.g. at temperatures of from 20 to 300° C., preferably from 40 to 250° C. A thermal after-treatment can be combined directly with the removal of the solvent or else can be carried out after some interval of time after production of the coating.

The duration of the heat treatment is from 5 seconds to a number of hours, depending on the type of polymer used for the coating. The thermal treatment can also be carried out using temperature profiles with different temperatures and residence times.

The heat treatment can be carried out, for example, by moving the coated anode bodies through a heating chamber which is at the desired temperature at such a speed that the desired residence time at the desired temperature is achieved, or bringing it into contact with a hotplate at the desired temperature for the desired residence time. Furthermore, the heat treatment can be carried out, for example, in an oven or a plurality of ovens each having a different temperature.

After removal of the solvent (drying) and, if appropriate, after thermal after-treatment, it can be advantageous to wash the excess oxidant and residual salts out of the coating by means of a suitable solvent, preferably water or alcohols. For the present purposes, residual salts are salts of the reduced form of the oxidant and possibly further salts present.

The electrochemical oxidative polymerization of the substituted 3,4-alkylene-dioxythiophenes of the formula (II) can be carried out at temperatures of from −78° C. to the boiling point of the solvent used. Preference is given to carrying out the electropolymerization at temperatures of from −20° C. to 60° C.

Depending on the monomer used, the electrolyte used, the electropolymerization temperature chosen and the current density employed, the reaction times can be from 1 minute to 24 hours.

If the thiophenes of the formula (II) are liquid, the electropolymerization can be carried out in the presence or absence of solvents which are inert under the electropolymerization conditions; the electropolymerization of solid thiophenes of the formula (II) is carried out in the presence of solvents which are inert under the electropolymerization conditions. In particular cases, it can be advantageous to use solvent mixtures and/or to add solubilizers (detergents) to the solvents.

Examples of solvents which are inert under the electropolymerization conditions are: water; alcohols such as methanol and ethanol; ketones such as acetophenone; halogenated hydrocarbons such as methylene chloride, chloroform, carbon tetrachloride and fluorinated hydrocarbons; esters such as ethyl acetate and butyl acetate; carbonic esters such as propylene carbonate; aromatic hydrocarbons such as benzene, toluene, xylene; aliphatic hydrocarbons such as pentane, hexane, heptane and cyclohexane; nitriles such as acetonitrile and benzonitrile; sulphoxides such as dimethylsulphoxide; sulphones such as dimethyl sulphone, phenyl methyl sulphone and sulpholane; liquid aliphatic amides such as methylacetamide, dimethylacetamide, dimethylformamide, pyrrolidone, N-methylpyrrolidone, N-methylcaprolactam; aliphatic and mixed aliphatic-aromatic ethers such as diethyl ether and anisole; liquid ureas such as tetramethylurea or N-N-dimethylimidazolidinones.

To carry out the electropolymerization, the substituted 3,4-alkylenedioxythiophenes of the formula (II) or their solutions are admixed with electrolyte additives. As electrolyte additives, preference is given to using free acids or customary conductance salts which have some solubility in the solvents used. Electrolyte additives which have been found to be useful are, for example: free acids such as p-toluenesulphonic acid, methanesulphonic acid, also salts having alkanesulphonate, aromatic sulphonate, tetrafluoroborate, hexafluorophosphate, perchlorate, hexafluoroantimonate, hexafluoroarsenate and hexachloroantimonate anions and alkali metal, alkaline earth metal or unsubstituted or alkylated ammonium, phosphonium, sulphonium and oxonium cations.

The concentrations of the monomeric thiophenes of the formula (II) can be from 0.01 to 100% by weight (100% by weight only in the case of a liquid thiophene); the concentrations are preferably from 0.1 to 20% by weight, particularly preferably from 0.1 to 5% by weight.

The electropolymerization can be carried out batchwise or continuously.

The current densities for the electropolymerization can vary within wide limits; the electropolymerization is usually carried out using current densities of from 0.0001 to 100 mA/cm$^2$, preferably from 0.01 to 40 mA/cm$^2$. Voltages of from about 0.1 to 50 V are established at these current densities.

Suitable counterions are the abovementioned monomeric or polymeric anions, preferably those of monomeric or polymeric alkanesulphonic or cycloalkanesulphonic acids or aromatic sulphonic acids. Particular preference is given to using the anions of monomeric alkanesulphonic or cycloalkanesulphonic acids or aromatic sulphonic acids in the electrolytic capacitors of the invention, since solutions containing these can penetrate more readily into the porous anode material and thus produce a relatively large contact area between this and the solid electrolyte. The counterions are, for example, added to the solutions in the form of their alkali metal salts or as free acids. In the case of electrochemical polymerization, these counterions may be added to the electropolymerization solution or the thiophenes as electrolyte additives or conductance salts.

Furthermore, any anions of the oxidant used which are present can serve as counterions, so that in the case of polymerization by chemical oxidative means an addition of additional counterions is not absolutely necessary.

The present invention further provides for the use of polythiophenes comprising recurring units of the formula (I),

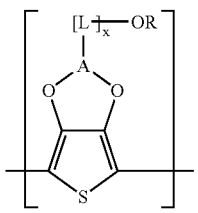

where
A, L, x and R are as defined above, as solid electrolytes in electrolytic capacitors, preferably in capacitors containing as oxidizable metal a valve metal or a compound having comparable properties, particularly preferably tantalum, niobium, aluminium, titanium, zirconium, hafnium, vanadium, an alloy or compound of at least one of these metals with other elements, NbO or an alloy or compound of NbO with other elements.

The use according to the invention of the polythiophenes comprising recurring units of the formula (I) as solid electrolytes in electrolytic capacitors offers the advantage over known solid electrolytes such as poly(3,4-ethylenedioxythiophene) such that excess oxidant and residual salts which may remain in the polythiophene layer despite washing are more strongly bound in the layer so that the tendency to crystallize is significantly lower. As a result, the washing procedure can in some cases be omitted completely without the quality of the polythiophene layer being significantly impaired, which simplifies the production process. Since the crystals formed in capacitors comprising known solid electrolytes can lead to the disadvantages of an increased series resistance due to formation of contact resistances or damage to the dielectric (oxide layer) or the coating comprising further layers having a good conductivity, e.g. graphite and silver, described at the outset, the electrolytic capacitors of the invention in which crystallization is suppressed display lower series resistances.

Furthermore, the polythiophenes comprising recurring units of the formula (I) advantageously display a higher conductivity than, for example, the known poly(3,4-ethylenedioxythiophenes), and the coatings applied to the anode bodies are surprisingly more homogeneous than, for example, those of the known poly(3,4-ethylenedioxythiophene). This improved homogeneity, namely a reduction in unevenesses and in the number of holes present, reduces, for example, the penetration of graphite or silver through the polythiophene coating and thus contact with the dielectric. In the case of poly(3,4-ethylenedioxythiophene) coatings having a lower homogeneity, such penetration can occur more easily, for example at particularly thin points or holes resulting from unevenesses. Accordingly, the leakage current in the electrolytic capacitors of the invention is reduced.

Moreover, the polythiophenes comprising recurring units of the formula (I) are suitable not only as solid electrolytes in electrolytic capacitors but likewise for producing particularly conductive layers for other applications. Surprisingly, an increased conductivity compared to layers of the polythiophenes known from U.S. Pat. No. 5,111,327 is observed.

According to the invention, the layers are produced by a process which gives the conductive layers directly by oxidative polymerization of thiophenes of the formula (II) to form polythiophenes comprising recurring units of the formula (I) without further reduction and reoxidation steps being needed. This leads not only to considerable simplification of the process but also to an unexpected increase in the conductivity to 150 S/cm and more.

The oxidative polymerization can be carried out chemically or electrochemically.

The present invention therefore further provides a process for producing electrically conductive layers having a specific conductivity of at least 150 S/cm, preferably at least 180 S/cm, particularly preferably at least 200 S/cm, which is characterized in that compounds of the formula (II) or a mixture of compounds of the formula (II),

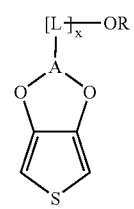

where
A, L, x and R are as defined for the formula (I), an oxidant and, if appropriate, counterions are applied to a substrate, either together or in succession and preferably in the form of solutions, and are chemically polymerized at temperatures of from −10° C. to 250° C., preferably at temperatures of from 0° C. to 200° C., on this substrate to form the polythiophenes of the formula (I),

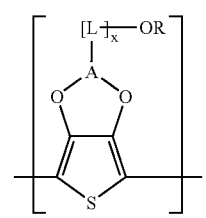

where
A, L, x and R are as defined above.

The present invention likewise provides a process for producing electrically conductive layers having a specific conductivity of at least 150 S/cm, preferably at least 180 S/cm, particularly preferably at least 200 S/cm, which is characterized in that compounds of the formula (II) or a mixture of compounds of the formula (II),

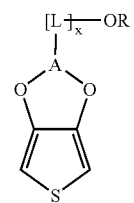

where

A, L, x and R are as defined for the formula (I), and counterions are applied, preferably from solution, to a substrate by electrochemical polymerization at temperatures of from −78° C. to 250° C. to form the polythiophenes comprising recurring units of the formula (I),

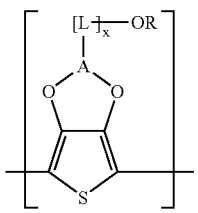
(I)

where

A, L, x and R are as defined above.

These are preferably processes characterized in that compounds of the formulae (II-a) and/or (II-b) or a mixture thereof,

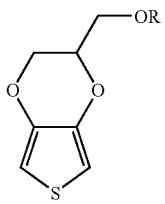
(II-a)

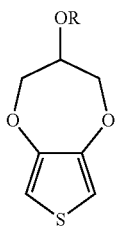
(II-b)

where

R is as defined for the formula (I) but is particularly preferably H, are polymerized by oxidative chemical means or by electrochemical oxidation.

These are particularly preferably processes in which a mixture of the thiophenes (II-a) and (II-b),

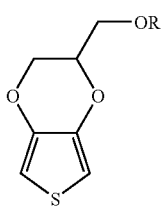
(II-a)

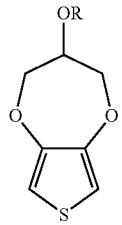
(II-b)

where

R is as defined above but is particularly preferably H, as mixture of compounds of formula (II) is polymerized by oxidative chemical means or by electrochemical oxidation.

Examples and preferred examples of reaction conditions, molar ratios, percentages by weight, solvents, oxidants, conductance salts and counterions and also variants or particular features described in connection with these for carrying out the chemical or electrochemical oxidative polymerization correspond to those described above for the production of the electrolytic capacitors.

For example, preferred oxidants are alkali metal or ammonium peroxodisulphates, hydrogen peroxide, perborates, iron(III) salts of organic acids, iron(III) salts of inorganic acids or iron(III) salts of inorganic acids having organic radicals, with representatives of the salts having been mentioned above by way of example.

Thiophenes, oxidants and, if appropriate, counterions can likewise be applied together or in succession to the substrate under the abovementioned conditions.

Furthermore, the solutions used can additionally contain one or more binders, crosslinkers and/or additives selected from those mentioned above by way of example.

The counterions are anions of monomeric or polymeric alkanesulphonic or cycloalkanesulphonic acids or aromatic sulfonic acids selected from those mentioned above by way of example; in the formation of polymer films, the polyanions can lead to improved film-forming properties.

The electrically conductive layers produced according to the invention can, as described in the case of the electrolytic capacitors, be washed with suitable solvents after polymerization and possibly after drying to remove excess oxidant and residual salts.

The substrate can be, for example, glass, flexible (very thin) glass or plastic which in the case of electrochemical polymerization is provided with a conductive layer (electrode).

Particularly useful plastics are: polycarbonates, polyesters such as PET and PEN (polyethylene terephthalate and polyethylene naphthaline dicarboxylate), copolycarbonates, polysulphone, polyether sulphone, polyimide, polyethylene, polypropylene or cyclic polyolefins or cyclic olefin copolymers (COC), hydrogenated styrene polymers or hydrogenated styrene copolymers.

Suitable polymer substrates can be, for example, films such as polyester films, PES films from Sumitomo or polycarbonate films from Bayer AG (Makrofol®).

The conductive layers produced according to the invention can remain on the substrate or be detached from this.

Depending on the application, the polythiophene layers have a thickness of from 1 nm to 100 μm, preferably from 10 nm to 10 μm, particularly preferably from 50 nm to 1 μm.

The present invention further provides electrically conductive layers having a specific conductivity of at least 150 S/cm, preferably at least 180 S/cm, particularly preferably at least 200 S/cm, obtainable by one of the above-described processes of the invention. They can advantageously be transparent.

The layers of the invention are very suitable for use as antistatic coatings, as transparent heating, as transparent or opaque electrodes, as hole-injecting or hole-conducting layers in organic light-emitting diodes, for through-plating of printed circuit boards or as solid electrolyte in electrolytic capacitors.

As antistatic coatings, they can be used, for example, on films, packaging for electronic components, for coating plastic films and for coating VDUs (visual display units). Furthermore, they can be used as cathode materials in capacitors, as transparent electrodes, e.g. in displays, for example as substitute for indium-tin-oxide electrodes, or as electrical conductors in polymer electronics. Further possible uses are sensors, batteries, solar cells, electrochromic windows (smart windows) and displays and also corrosion protection.

In these applications, too, the better binding of salts such as excess oxidant and residual salts and the improved homogeneity of the layers offer significant advantages over known layers, for example poly(3,4-ethylenedioxythiophene) layers, together with additionally improved conductivity.

It is likewise surprising that the layers produced by the process of the invention are found to have an improved conductivity compared to known layers comprising polythiophenes comprising recurring units of the formula (I). In addition, the process of the invention is significantly simpler to carry out than that described in U.S. Pat. No. 5,111,327.

The invention is further illustrated but is not intended to be limited by the following examples in which all parts and percentages are by weight unless otherwise specified.

EXAMPLES

Example 1

A solution consisting of 0.6 g of substituted 3,4-alkylenedioxythiophene (3.5 mmol) (composed of 80% of the compound (II-a-1) and 20% of the compound (II-b-1)), 4.5 g of iron(III) tosylate (7.9 mmol) and 6.75 g of butanol (91 mmol) was prepared and part of the solution was applied to a glass substrate by means of a spin coater at 2000 rpm for 5 seconds. The specimen was dried at 25° C. for 15 minutes and subsequently washed in methanol for 15 minutes. After drying, the surface resistance was determined by means of a four-point measurement using a Keithley 199 multimeter. The thickness of the layer was determined using a Tencor Alpha Step 500 surface profiler. The specific conductivity was determined from the surface resistance and layer thickness.

For comparison, a solution consisting of 0.5 g of 3,4-ethylenedioxythiophene (3.5 mmol), 4.5 g of iron(II) tosylate (7.9 mmol) and 6.75 g of butanol (91 mmol) was prepared and a specimen was likewise produced from this by a method analogous to that described above.

The following measured values were obtained:

|  | Substituted 3,4-alkylenedioxythiophene | 3,4-Ethylenedioxythiophene |
| --- | --- | --- |
| Surface resistance | 118 Ω/square | 258 Ω/square |
| Layer thickness | 375 nm | 306 nm |
| Specific conductivity | 226 S/cm | 127 S/cm |

The specimen according to the invention comprising substituted poly(3,4-alkylenedioxythiophene) has a significantly higher specific conductivity than the specimen comprising poly(3,4-ethylenedioxythiophene). At the same time, the layer thickness is greater, which in combination with the higher conductivity leads to considerably lower surface resistances.

Example 2

Specimens were produced by a method analogous to Example 1 and optical microscope images of the films were taken at a magnification of 1000×.

Figure 2:
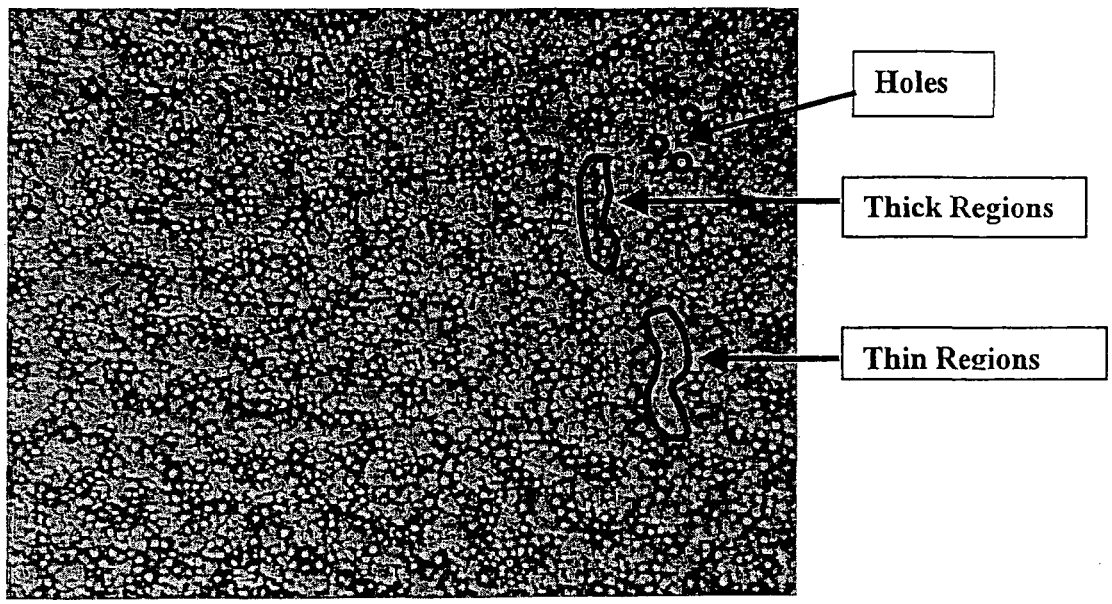
FIG. 2 shows an optical microscope image of a conductive film of substituted poly (3,4-ethylenedioxythiophene).

FIG. 1 shows the microscope image of the conductive film of poly(3,4-alkylenedioxythiophene) according to the invention prepared from the monomers (II-a-1) and (II-b-1), FIG. 2 shows the microscope image of the conductive film of poly(3,4-ethylenedioxythiophene). Light regions indicate holes or relatively thin points in the film. While the film of substituted poly(3,4-alkylenedioxythiophene) according to the invention prepared from the monomers (II-a-1) and (II-b-1) is very homogeneous, the film of poly(3,4-ethylenedioxythiophene) is very inhomogeneous in terms of its thickness and has very many holes.

FIG. 1: Optical microscope image of a conductive film of substituted poly(3,4-alkylenedioxythiophene) according to the invention prepared from compounds (II-a-1) and (II-b-1)(Example 2)

FIG. 2: Optical microscope image of a conductive film of substituted poly (3,4-ethylenedioxythiophene) (Example 2)

Example 3

A solution consisting of 0.6 g of substituted 3,4-alkylenedioxythiophene (3.5 mmol) (composed of 80% of the compound (II-a-1) and 20% of the compound (II-b-1)), 4.5 g of iron(III) tosylate (7.9 mmol) and 6.75 g of butanol (91 mmol) was prepared and part of the solution was applied to a glass substrate by means of a spin coater at 2,000 rpm for 5 seconds. The specimen was dried at 25° C. for 15 minutes.

For comparison, a solution consisting of 0.5 g of 3,4-ethylenedioxythiophene (3.5 mmol), 4.5 g of iron(III) tosylate (7.9 mmol) and 6.75 g of butanol (91 mmol) was prepared and a specimen was likewise produced from this by a method analogous to that described above.

Optical microscope images of the specimens were taken at a magnification of 1000×.

Figure 3:
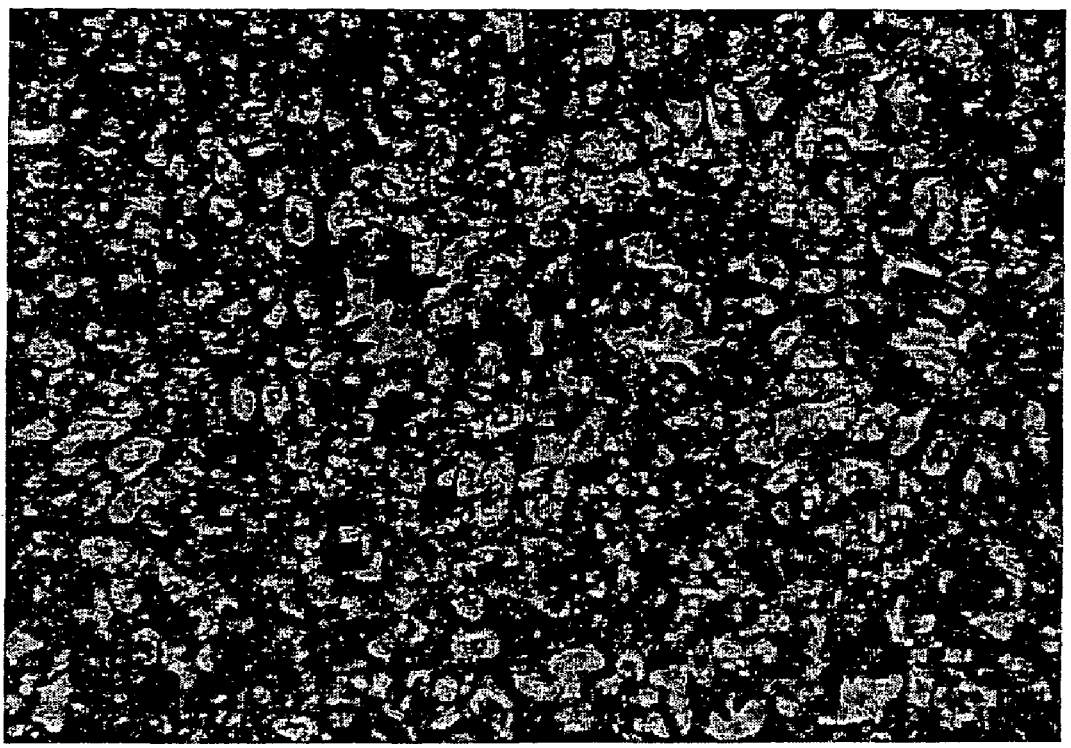
FIG. 3: Optical microscope image of an unwashed film of substituted poly(3,4-alkylenedioxythiophene) prepared from the compounds (II-a-1) and (II-b-1).
Figure 4:
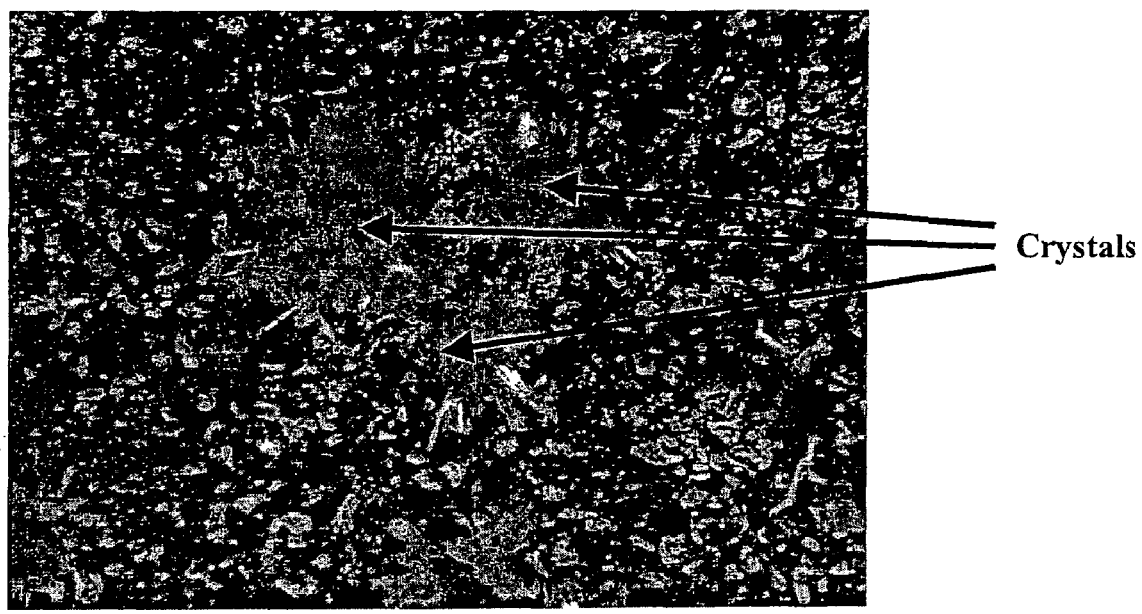
FIG. 4: Optical microscope image of an unwashed film of poly(3,4-ethylenedioxythiophene).

FIG. 3 shows the microscope image of the unwashed film of substituted poly(3,4-alkylenedioxythiophene) prepared from the monomers (II-a-1) and (II-b-1) after storage for 17 hours, FIG. 4 shows the microscope image of the unwashed film of poly(3,4-ethylenedioxythiophene) after storage for 17 hours. Yellow iron salt crystals can clearly be seen in the film of poly(3,4-ethylenedioxythiophene). The film of substituted poly(3,4-alkylenedioxythiophene) according to the invention prepared from the monomers (II-a-1) and (II-b-1) binds the iron salts, so that crystallization does not occur here.

FIG. 3: Optical microscope image of an unwashed film of substituted poly(3,4-alkylenedioxythiophene) prepared from the compounds (II-a-1) and (II-b-1) (Example 3)

FIG. 4: Optical microscope image of an unwashed film of poly(3,4-ethylenedioxythiophene) (Example 3)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An electrolytic capacitor comprising:
a layer of an oxidizable metal;
a layer of oxide of this metal;
a solid electrolyte; and
contacts,
wherein the solid electrolyte comprises polythiophenes comprising recurring units of at least one formula (I-b),

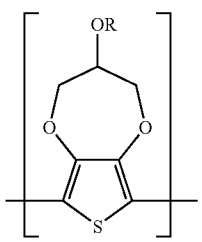

(I-b)

where
R is $C_1$–$C_{18}$-alkyl, $C_7$–$C_{18}$-aralkyl, $C_5$–$C_{14}$-aryl or $C_5$–$C_{12}$-cycloalkyl which are each optionally unsubstituted or additionally substituted by $SO_3H$, $SO_3^-$, COOH or $COO^-$.

2. The electrolytic capacitor of claim 1 wherein the oxidizable metal is a valve metal or a compound having comparable properties.

3. The electrolytic capacitor of claim 2 wherein the valve metal or the compound having comparable properties is tantalum, niobium, aluminium, titanium, zirconium, hafnium, vanadium, an alloy or compound of at least one of these metals with other elements, NbO or an alloy or compound of NbO with other elements.

4. A process for producing the electrolytic capacitor according to claim 1, comprising:
applying at least one compound of the formula (II-b),

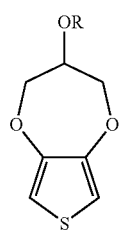

(II-b)

an oxidant and, optionally, counterions to the oxide layer of the metal, either together or in succession and optionally in the form of solution, and chemically polymerizing the applied compounds or mixture of compounds at temperatures of from –10° C. to 250° C., to form the polythiophenes comprising recurring units of at least one formula (I-b).

5. The process of claim 4, wherein alkali metal or ammonium peroxodisulphates, hydrogen peroxide, alkali metal perborates, iron (III) salts of organic acids, iron (III) salts of inorganic acids or iron (III) salts of inorganic acids having organic radicals are used as the oxidant.

6. The process of claim 4, wherein the solutions additionally contain at least one of binders, crosslinkers and additives.

7. The process of claim 4, wherein the counterions are anions of monomeric or polymeric alkanesulphonic or cycloalkane-sulphonic acids or aromatic sulphonic acids.

8. The process of claim 4, wherein the layer comprising the polythiophenes (electrolyte layer) is washed after the polymerization and optionally after drying with suitable solvents to remove excess oxidant and residual salts.

9. A process for producing the electrolytic capacitor of claim 1, wherein at least one compound of the formula (II-b),

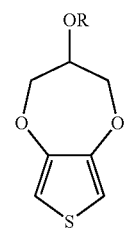

(II-b)

and counterions are applied, optionally from solution, to an oxide layer of a metal by electrochemical polymerization at temperatures of from –78° C. to 250° C. to form the polythiophenes comprising recurring units of at least one formula (I-b).

10. A method for preparing electrolytic capacitors comprising providing polythiophenes comprising recurring units of at least one formula (I-b),

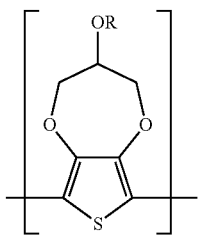

(I-b)

where
R is $C_1$–$C_{18}$-alkyl, $C_7$–$C_{18}$-aralkyl, $C_5$–$C_{14}$-aryl or $C_5$–$C_{12}$-cycloalkyl which is each optionally unsubstituted or additionally substituted by $SO_3H$, $SO_3^-$, COOH or $COO^-$, as solid electrolytes.

11. The method of claim 10 wherein in the electrolytic capacitors further comprise a layer of an oxidizable metal, the oxidizable metal is selected from the group consisting of a valve metal and a compound having properties comparable to a valve metal.

12. The method of claim 11 wherein in the electrolytic capacitors, the valve metal or the compound having comparable properties is tantalum, niobium, aluminium, titanium, zirconium, hafnium, vanadium, an alloy or compound of at least one of these metals with other elements, NbO or an alloy or compound of NbO with other elements.

13. A process for producing electrically conductive layers having a specific conductivity of at least 150 S/cm, comprising applying compounds of at least one formula (II-a) and (II-b),

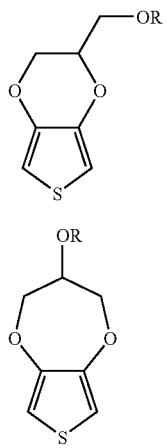

where
R is H or $C_1$–$C_{18}$-alkyl, $C_7$–$C_{18}$-aralkyl, $C_5$–$C_{14}$-aryl or $C_5$–$C_{12}$-cycloalkyl which are each optionally unsubstituted or additionally substituted by $SO_3H$, $SO_3^-$, COOH or COO$^-$, an oxidant and, optionally counterions to a substrate, either together or in succession and, optionally in the form of solutions, and chemically polymerizing on this substrate at temperatures of from −10° C. to 250° C., to form the polythiophenes of at least one of formula (I-a) and (I-b),

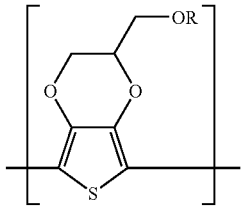

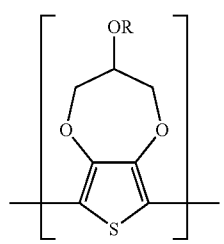

where
R is H or $C_1$–$C_{18}$-alkyl, $C_7$–$C_{18}$-aralkyl, $C_5$–$C_{14}$-aryl or $C_5$–$C_{12}$-cycloalkyl which is each optionally unsubstituted or additionally substituted by $SO_3H$, $SO_3^-$, COOH or COO$^-$.

14. The process of claim 13, wherein R is H.

15. The process of claim 13, wherein alkali metal or ammonium peroxodisulphates, hydrogen peroxide, perborates, iron(III) salts of organic acids, iron(III) salts of inorganic acids or iron(III) salts of inorganic acids having organic radicals are used as the oxidant.

16. The process of claim 13, wherein the solutions additionally contain at least one of binders, crosslinkers and additives.

17. The process of claim 13, wherein the counterions are selected from the group consisting of anions of monomeric alkanesulphonic acids, anions of monomeric cycloalkanesulphonic acids, anions of monomeric aromatic sulphonic acids, anions of polymeric alkanesulphonic acids, anions of polymeric cycloalkanesulphonic acids and anions of polymeric aromatic sulphonic acids.

18. The process of claim 13, wherein the electrically conductive layer is washed after the polymerization and optionally after drying with suitable solvents to remove excess oxidant and residual salts.

19. An electrically conductive layer formed by the process of claim 13.

20. The electrically conductive layer of claim 19, wherein said electrically conductive layer is transparent.

21. A process for preparing antistatic coatings, transparent heating, transparent or opaque electrodes, hole-injecting or hole-conducting layers in organic light-emitting diodes, through-plating of printed circuit boards or solid electrolyte in electrolytic capacitors comprising providing electrically conductive layers according to claim 19.

22. A process for producing electrically conductive layers having a specific conductivity of at least 150 S/cm, wherein compounds of at least one formula (II-a) and (II-b),

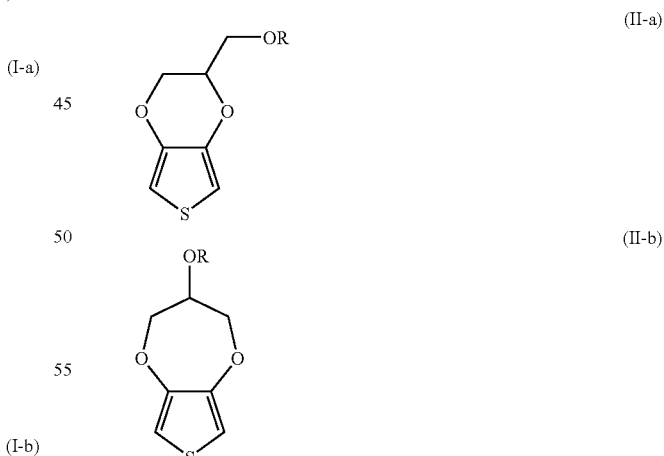

where
R is H or $C_1$–$C_{18}$-alkyl, $C_7$–$C_{18}$-aralkyl, $C_5$–$C_{14}$-aryl or $C_5$–$C_{12}$-cycloalkyl which is each optionally unsubstituted or additionally substituted by $SO_3H$, $SO_3^-$, COOH or COO$^-$, and counterions are applied, optionally from solution, to a substrate by electrochemical polymerization at temperatures of from −78° C. to 250° C. to form the polythiophenes comprising recurring units of at least one formula (I-a) and (I-b),

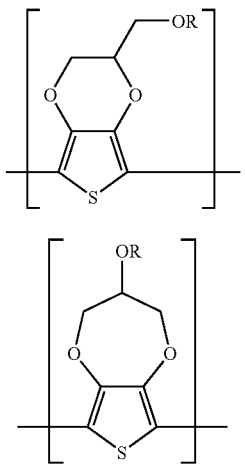

(I-a)

(I-b)

where
R is H or $C_1$–$C_{18}$-alkyl, $C_7$–$C_{18}$-aralkyl, $C_5$–$C_{14}$-aryl or $C_5$–$C_{12}$-cycloalkyl which is each optionally unsubstituted or additionally substituted by $SO_3H$, $SO_3^-$, COOH or $COO^-$.

23. The process of claim 22 wherein the solution additionally contain at least one of binders, crosslinkers and additives.

24. The process of claim 22 wherein the counterions are selected from the group consisting of anions of monomeric alkanesulphonic acids, anions of monomeric cycloalkanesulphonic acids, anions of monomeric aromatic sulphonic acids, anions of polymeric alkanesulphonic acids, anions of polymeric cycloalkanesulphonic acids and anions of polymeric aromatic sulphonic acids.

25. The process of claim 22 wherein the electrically conductive layer is washed after the polymerization and optionally after drying with suitable solvents to remove excess oxidant and residual salts.

26. An electrically conductive layer formed by the process of claim 22.

27. The electrically conductive layer of claim 26 wherein said electrically conductive layer is transparent.

28. A process for preparing antistatic coatings, transparent heating, transparent or opaque electrodes, hole-injecting or hole-conducting layers in organic light-emitting diodes, through-plating of printed circuit boards or solid electrolyte in electrolytic capacitors comprising providing electrically conductive layers according to claim 26.

* * * * *